Reissued Feb. 5, 1929. Re. 17,207

UNITED STATES PATENT OFFICE.

ORLANDO A. COLLINGS, OF KANSAS CITY, MISSOURI, ASSIGNOR, BY MESNE ASSIGNMENTS, TO SILICA PRODUCTS CO., OF LOS ANGELES, CALIFORNIA, A CORPORATION OF DELAWARE.

WATERPROOF PLASTIC.

No Drawing. Original No. 1,650,864, dated November 29, 1927, Serial No. 549,211, filed April 3, 1922. Application for reissue filed October 20, 1928. Serial No. 313,936.

This invention relates to waterproof plastics and more particularly to waterproof, plastic, hydraulic cements and mortars, and concretes made from these; and it comprises a method of waterproofing concrete, stucco, mortar, plaster of Paris, etc., wherein, the materials employed for making such a plastic are admixed, at the time of gaging the inert fillers, or prior thereto, with an insoluble dry mineral matter of the nature of a gelatinizable "reversible colloid", such as dry bentonite; and it further comprises as a new and waterproof material, a set calcareous plastic material containing disseminated particles of a relatively dry mineral material having the properties of a gelatinizable reversible colloid, such as bentonite; all as more fully hereinafter set forth and as claimed.

For the present purposes, concrete may be regarded as a rigid skeleton of coarse aggregate (gravel, broken rock or the like) containing a finer aggregate (sand, etc. and cement) in its voids as a binder. As water and cement after settling do not have quite their original joint volume and as a limit is placed to the contraction of the concrete as a whole by the rigidity of the coarser aggregate, it follows that such a concrete must be, of necessity, more or less minutely pervious. The degree of perviousness can be and is much reduced by proper selection and proportioning of materials and by correct methods of mixing and applying the concrete and with the correct proportion of water and with proper plasticity of the mixture; but there is an irreducible minimum of perviousness with the best of work. Sometimes this pervious character is unimportant, as in cases where the concrete is not used in wet or moist situations. But sometimes, the pervious character is a serious objection, as in concrete exposed to water under hydrostatic head, in stucco coatings, etc.

It is the purpose of the present invention to obviate this penetrability by water. To this end, I use in concrete of normal composition, in addition to the usual materials, a small proportion of a dry mineral matter having the properties of a reversible swelling or gelatinizable colloid to produce a plastic mass with water, capable of swelling with water and of being dried without forfeiting its swelling power on again wetting. Many materials of this character are known, such as partially dehydrated silica and alumina gels and certain natural and artificial silicates. But I regard some varieties of a mineral known as bentonite as the most available for the present purposes. Bentonite on prolonged contact with large excess of water takes up large amounts thereof with a great increase in volume. Some varieties of minerals called "bentonite" on drying lose this swelling power but with others of the typical bentonite character the swollen mineral can be dried with contraction to its original volume and without forfeiting its power of swelling again when moistened, although some lose the swelling property in part only. Bentonite of this typical character is best adapted for my purpose. Although sometimes regarded as being, generically, a "clay", bentonite is not really a clay in the ordinary sense. Unlike clays, a moderate degree of roasting does not impair materially its property of taking up water to form a plastic mass. Like the clays, however, the presence of free lime tends to hinder, though it does not overcome, its assuming a dispersoid state or condition; and, for this reason and because its hydration requires time, it can be admixed with the wet concrete batch without much moistening or complete swelling. The water of the wet mix goes preferentially to the cement constituents during the time occupied in setting and the bentonite particles are intimately mixed with the water physically but without complete chemical combination, so that the bentonite subsequently remains in a condition in which it is able to take up water. After the concrete is set these minerals are hydrated and the bulk of the free lime has disappeared so that free swelling of the bentonite by water is no longer inhibited.

I find it rather better to give the bentonite a slight roast preliminary to using it for the present purposes, heating it to a temperature at which it is dried and perhaps somewhat dehydrated but not to any temperature at which it will lose the property of free swelling with water here important. The bentonite is advantageously used in a rather coarse condition although for some purposes, it may be used in a somewhat finer condition. It may be admixed with cement in the clinker grinding mills or added to the mix just prior to making the concrete. As is well known, clinker is the product referred to in the burning of argillaceous and calcareous materials in rotary or vertical kilns in the production of natural and Portland cements. The purpose of mixing the bentonite with the clinker is to obtain a more complete and intimate mixing. It is to be observed that the bentonite may also be added to the ground cement at any stage between the clinker mills and the mortar or concrete mixer. The amount of bentonite added is that which is necessary for retaining the plastic properties and giving waterproof qualities, and will vary within wide limits, depending upon the extent of the plastic and waterproof properties desired and the qualities of bentonite used. In the concrete, it does not swell to any material extent during mixing and setting, for reasons stated ante, nor is it much affected by the cement; it remains in the wet material in its orginal unhydrated state during the setting, the particles are, however, intimately mixed with the water physically but without permanently taking on the water chemically. On subsequent exposure of the said concrete to water, the moisture entering through any pore encounters the bentonite and swells it, effectually plugging the pore. Concrete made with 2 to 5 per cent bentonite is capable of withstanding considerable hydrostatic heads of water. Higher proportions may be used.

Dry bentonite may be admixed with plaster of Paris prior to making molded objects with the same results and the same advantages. It may be used in lime mortars and other calcareous plastics but I regard its most advantageous use as in connection with concrete and stucco. A layer of concrete, waterproofed in the present manner, may be advantageously used as a facing for ordinary concrete in walls intended to resist dampness or water; building walls, reservoir walls, retaining walls, roofing tiles and facing, etc.

Bentonite may be mixed with cement and water alone and used in relations where neat cement is employed. A mixture of bentonite, cement and sand is useful in making water tight joints, as in roofing work or water tight facings.

Unlike other waterproofing additions to concrete bentonite does not lessen the strength but increases it.

What I claim is:—

1. The process of preparing a calcareous plastic capable of becoming impervious to water on access of moisture which comprises incorporating dry bentonite into such a plastic.

2. The process of preparing a calcareous plastic capable of becoming impervious to water on access of moisture which comprises mixing dry bentonite with water and a cement of the Portland cement type, the amount of water used being merely that which will be taken up by the cement.

3. A set calcareous cement of normal composition containing unswollen bentonite capable of swelling on access of moisture.

4. Concrete composed of a set concrete of the Portland cement type and of normal composition, said concrete containing unswollen bentonite capable of swelling on access of moisture.

5. As a concrete, a set cement containing in addition to the aggregate an unswollen material of the nature of a gelatinizable reversible colloid.

6. A set cement containing unswollen bentonite.

7. A plastic composition which will set to form a waterproof concrete comprising Portland cement and approximately five per cent of bentonite.

8. The process of making a waterproof concrete which comprises the addition to a Portland cement mixture of approximately five per cent of bentonite.

9. A waterproof Portland cement concrete of at least normal strength characterized by the admixture of approximately five per cent of bentonite with the cement before it has set.

10. Set calcareous cement containing bentonite in such condition as to swell upon access of moisture thereto, thereby rendering said cement impervious to water.

11. A cementitious composition consisting of an intimate dry mitxure of ground cement clinker and a gelatinizable mineral matter.

12. A composition consisting of hydraulic cement and bentonite adapted to form a plastic upon the addition of water.

13. A dry mortar capable of setting only by the addition of water consisting of an intimate mixture of Portland cement in which is incorporated a quantity of bentonite and an inert filler.

14. A potentially reactive dry plastic mix consisting of Portland cement, bentonite, and an inert filler.

15. A potentially reactive dry plastic mix consisting of Portland cement, bentonite and an aggregate.

In testimony whereof, I have hereunto affixed my signature.

ORLANDO A. COLLINGS.